(12) United States Patent
Holt (10) Patent No.: US 7,894,341 B2
(45) Date of Patent: Feb. 22, 2011

(54) SWITCH PROTOCOL FOR NETWORK COMMUNICATIONS

(75) Inventor: John M. Holt, Essex (GB)

(73) Assignee: Waratek Pty Ltd., Lindfield, New South Wales (AU)

(*) Notice: Subject to any disclaimer, the term of this patent is extended or adjusted under 35 U.S.C. 154(b) by 472 days.

(21) Appl. No.: 11/973,379

(22) Filed: Oct. 5, 2007

(65) Prior Publication Data

US 2008/0123642 A1 May 29, 2008

Related U.S. Application Data

(60) Provisional application No. 60/850,519, filed on Oct. 9, 2006, provisional application No. 60/850,528, filed on Oct. 9, 2006, provisional application No. 60/850,531, filed on Oct. 9, 2006, provisional application No. 60/850,711, filed on Oct. 9, 2006.

(30) Foreign Application Priority Data

| Oct. 5, 2006 | (AU) | ................ | 2006905503 |
| Oct. 5, 2006 | (AU) | ................ | 2006905527 |
| Oct. 5, 2006 | (AU) | ................ | 2006905533 |
| Oct. 5, 2006 | (AU) | ................ | 2006905539 |

(51) Int. Cl.
*G01R 31/08* (2006.01)

(52) U.S. Cl. .................... 370/230; 370/235; 709/223

(58) Field of Classification Search ............... 370/230, 370/235, 216, 229, 254, 256, 401; 709/223, 709/224

See application file for complete search history.

(56) References Cited

U.S. PATENT DOCUMENTS 4,969,092 A   11/1990   Shorter
5,214,776 A   5/1993    Bagnoli et al.
5,291,597 A   3/1994    Shorter (Continued)

FOREIGN PATENT DOCUMENTS

EP   0969377   1/2000

(Continued)

OTHER PUBLICATIONS

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

(Continued)

*Primary Examiner*—Jayanti K Patel
*Assistant Examiner*—Jung Park
(74) *Attorney, Agent, or Firm*—Pillsbury Winthrop Shaw Pittman LLP (57) ABSTRACT

A switch protocol for network communications (particularly but not exclusively for multiple computer systems) is disclosed in which each switch maintains a list of addresses which can be reached via each port of the switch. In addition, prior to delivering a message or packet to a port, the switch deletes any address in the message or packet which is unable to be reached via that port. The arrangement saves the repetitive sending of uni-cast messages and also saves broadcast messages being sent via the switches to computers which are not intended to receive the messages. Various networked topologies are also disclosed.

4 Claims, 5 Drawing Sheets

U.S. PATENT DOCUMENTS

| | | |
|---|---|---|
| 5,418,966 A | 5/1995 | Madduri |
| 5,434,994 A | 7/1995 | Shaheen et al. |
| 5,488,723 A | 1/1996 | Baradel et al. |
| 5,544,345 A | 8/1996 | Carpenter et al. |
| 5,568,609 A | 10/1996 | Sugiyama et al. |
| 5,612,865 A | 3/1997 | Dasgupta |
| 5,802,585 A | 9/1998 | Scales et al. |
| 5,918,248 A | 6/1999 | Newell et al. |
| 6,049,809 A | 4/2000 | Raman et al. |
| 6,148,377 A | 11/2000 | Carter et al. |
| 6,163,801 A | 12/2000 | O'Donnell et al. |
| 6,192,514 B1 | 2/2001 | Lurndal |
| 6,219,739 B1* | 4/2001 | Dutt et al. ............... 710/311 |
| 6,314,558 B1 | 11/2001 | Angel et al. |
| 6,324,587 B1 | 11/2001 | Trenbeath et al. |
| 6,327,630 B1 | 12/2001 | Carroll et al. |
| 6,370,625 B1 | 4/2002 | Carmean et al. |
| 6,389,423 B1 | 5/2002 | Sakakura |
| 6,425,016 B1 | 7/2002 | Banavar et al. |
| 6,571,278 B1 | 5/2003 | Negishi et al. |
| 6,574,628 B1 | 6/2003 | Kahn et al. |
| 6,574,674 B1 | 6/2003 | May et al. |
| 6,611,955 B1 | 8/2003 | Logean et al. |
| 6,625,751 B1 | 9/2003 | Starovic et al. |
| 6,668,260 B2 | 12/2003 | Zoltan |
| 6,757,896 B1 | 6/2004 | Cohen et al. |
| 6,760,903 B1 | 7/2004 | Morshed et al. |
| 6,775,831 B1 | 8/2004 | Carrasco et al. |
| 6,779,093 B1 | 8/2004 | Gupta |
| 6,782,492 B1 | 8/2004 | Nakaso |
| 6,823,511 B1 | 11/2004 | McKenney et al. |
| 6,862,608 B2 | 3/2005 | Buhlman et al. |
| 6,954,794 B2 | 10/2005 | Rudd et al. |
| 6,968,372 B1 | 11/2005 | Thompson et al. |
| 6,976,088 B1* | 12/2005 | Gai et al. ............... 709/238 |
| 7,010,576 B2 | 3/2006 | Bae |
| 7,020,736 B1 | 3/2006 | Cherukuri |
| 7,031,989 B2 | 4/2006 | Elmendorf et al. |
| 7,047,341 B2 | 5/2006 | Jung |
| 7,047,521 B2 | 5/2006 | Bunnell |
| 7,058,826 B2 | 6/2006 | Fung |
| 7,082,604 B2 | 7/2006 | Schneiderman |
| 7,206,827 B2 | 4/2007 | Viswanath et al. |
| 2002/0199172 A1 | 12/2002 | Bunnell |
| 2003/0004924 A1 | 1/2003 | Williams |
| 2003/0005407 A1 | 1/2003 | Hines |
| 2003/0067912 A1 | 4/2003 | Mead et al. |
| 2003/0105816 A1 | 6/2003 | Goswani |
| 2004/0073828 A1 | 4/2004 | Bronstein |
| 2004/0093588 A1 | 5/2004 | Gschwind et al. |
| 2004/0158819 A1 | 8/2004 | Cuomo et al. |
| 2004/0163077 A1 | 8/2004 | Dimpsey et al. |
| 2005/0039171 A1 | 2/2005 | Avakian et al. |
| 2005/0086384 A1 | 4/2005 | Ernst |
| 2005/0108481 A1 | 5/2005 | Iyengar et al. |
| 2005/0240737 A1 | 10/2005 | Holt |
| 2005/0257219 A1 | 11/2005 | Holt |
| 2005/0262313 A1 | 11/2005 | Holt |
| 2005/0262513 A1 | 11/2005 | Holt |
| 2006/0020913 A1 | 1/2006 | Holt |
| 2006/0080389 A1 | 4/2006 | Powers et al. |
| 2006/0095483 A1 | 5/2006 | Holt |
| 2006/0143350 A1 | 6/2006 | Miloushev et al. |
| 2006/0167878 A1 | 7/2006 | Hartman |
| 2006/0242464 A1 | 10/2006 | Holt |
| 2006/0253844 A1 | 11/2006 | Holt |
| 2006/0265703 A1 | 11/2006 | Holt |
| 2006/0265704 A1 | 11/2006 | Holt |
| 2006/0265705 A1 | 11/2006 | Holt |
| 2008/0072238 A1 | 3/2008 | Monnie et al. |
| 2008/0189700 A1 | 8/2008 | Schmidt et al. |

FOREIGN PATENT DOCUMENTS

| | | |
|---|---|---|
| WO | WO95/08809 | 3/1995 |
| WO | WO98/58330 | 12/1998 |
| WO | WO02/44835 | 6/2002 |
| WO | WO03/083614 | 10/2003 |
| WO | WO03084116 | 10/2003 |
| WO | WO2005/103924 | 11/2005 |
| WO | WO2005/103925 | 11/2005 |
| WO | WO2005/103926 | 11/2005 |
| WO | WO2005/103927 | 11/2005 |
| WO | WO2005/103928 | 11/2005 |
| WO | WO2006/110937 | 10/2006 |
| WO | WO2006/110957 | 10/2006 |

OTHER PUBLICATIONS

Bal, et al., "Experience with Distributed Programming in Orca", *IEEE CS International Conference on Computer Languages*, pp. 1-23, Mar. 1990, New Orleans, Louisiana.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications On Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Goethe, et al. "The Distributed Ada Run-Time System DARTS." Software Prac. & Experience, vol. 21, No. 1, pp. 1249-1263, Aug. 4, 1989.

Puatu, "Distributed Garbage Collection of Active Objects with No Global Synchronisation"—Lecture Notes in Computer Science, Memory Management [online], XP008098868 ISSN: 0302-9743 ISBN: 978-3-540-55940-5- Retreived from the internet URL:http//www.springerlink.com/content/5v 028411810p6m700/> ,vol. 637, pp. 148-1694 Sep. 17-19, 1992, IWMM 92, St. Malo, France.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. CONF. 13, May 25, 1993, pp. 491-498, WP010095684 ISBN:978-0-8186-3770-4.

Russ, et al., "The hector distributed run-time environment", IEEEE Transactions on Parallel and Distributed Systems, vol. 9, No. 111998, May 22, 1998.

Aridor, et al. "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19, Oct. 1998, Fort Lauderdale, FL.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bennett, et al. "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application-Transparent Fault Tolerance. Proc.", 28th Annual International Symposium on Fault-Tolerant Computing, pp. 128-137, Jun. 1998, Munich, Germany.

Chen, et al., "Multi-Jav: a distributed shared memory system based on multiple Java virtual machines." Proc. Of Conf. on Parallel & Distrib. Proc. Techn. & Appls., Las Vegas, NV, Jun. 1998.

Dasilva, et al. "An evaluation of cJava system architecture." IEEE Prc. 15th Symposium on Computer Architecture & High Performance Computing, pp. 1-9 , Nov. 10-12, 2003, San Paulo, Brazil.

Haumacher, et al. "Transparent distributed threads for Java," Parallel & Distributed Proc. Symposium 2003. Proc. Int'l. pp. 22-26, Apr. 2003.

Larus, et al. "EEL: machine-independent executable editing. 1995 ACM SIGGPLAN '95." pp. 291-300 Jun. 21-22, 1995.

Radovic, et al., "Removing the overhead from software-based shared memory." Prc. 2001 ACM/IEEE Conf. Supercomputing (CDrom), Denver CO, Nov. 10-16, 2001, Supercomuting '01. ACM Press. NY.

Shapiro, et al., "A Distributed Shared Persistent Memory and its Garbage Collector", Lecture notes in Computer Science, vol. 972, Proceedings of the 9th International Workshop on Distributed Algorithms, pp. 198-214, Sep. 13-15, 1995.

* cited by examiner

SWITCH PROTOCOL FOR NETWORK COMMUNICATIONS

CROSS-REFERENCE TO RELATED APPLICATIONS

This application claims benefit under 35 USC 119(e) to U.S. Provisional Application Nos. 60/850,519, 60/850,528, 60/850,531, and 60/850,711, all of which were filed 9 Oct. 2006. This application also claims priority under 35 USC 119(a)-(d) to Australian Provisional Application Nos. 2006905503, 2006905539, 2006905533, and 2006905527, all of which were filed on 5 Oct. 2006, each of which are hereby incorporated herein by reference.

This application is related to concurrently filed U.S. application Ser. No. 11/973,375 entitled "Switch Protocol for Network Communications," and concurrently filed U.S. application Ser. No. 11/973,378 entitled "Switch Protocol for Network Communications,", each of which are hereby incorporated herein by reference.

FIELD OF THE INVENTION

The present invention relates to the transmission of addressed data packages in a communications network including one or more switches and a plurality of sources and destinations of data. In the preferred arrangement, the sources and destinations of data each constitute a computer of a multiple computer system, however, the invention is not limited to multiple computer systems. For example, the present invention also finds application in other fields including the transmission of asynchronous data, for example stock exchange prices.

BACKGROUND

For an explanation of a multiple computer system incorporating replicated shared memory reference is made to the present applicant's International Patent Application No. WO 2005/103926 (to which U.S. patent application Ser. No. 11/111,946 corresponds), and to International Patent Application No PCT/AU2005/001641 (WO2006/110,937) to which U.S. patent application Ser. No. 11/259,885 entitled: "Computer Architecture Method of Operation for Multi-Computer Distributed Processing and Co-ordinated Memory and Asset Handling" corresponds, and to Australian Patent Application No. 2005 905 582 (to which U.S. patent application Ser. No. 11/583,958 (60/730,543) and PCT/AU2006/001447 (WO2007/041762) correspond). For an explanation of partial or hybrid replicated shared memory, reference is made to the present applicant's co-pending application PCT/AU2007/00147 filed simultaneously herewith and claiming priority from Australian patent application No. 2006 905 534 entitled "Hybrid Replicated Shared Memory Architecture", and to U.S. Patent Application No. 60/850,537 all of which are hereby incorporated by cross-reference for all purposes.

Briefly stated, the abovementioned patent specifications disclose that at least one application program written to be operated on only a single computer can be simultaneously operated on a number of computers each with independent local memory. The memory locations required for the operation of that program are replicated in the independent local memory of each computer. On each occasion on which the application program writes new data to any replicated memory location, that new data is transmitted and stored at each corresponding memory location of each computer. Thus apart from the possibility of transmission delays, each computer has a local memory the contents of which are substantially identical to the local memory of each other computer and are updated to remain so. Since all application programs, in general, read data much more frequently than they cause new data to be written, the abovementioned arrangement enables very substantial advantages in computing speed to be achieved. In particular, the stratagem enables two or more commodity computers interconnected by a commodity communications network to be operated simultaneously running under the application program written to be executed on only a single computer.

Prior art switch protocols rely upon a specific address for each message, which means that messages sent to some only of the computers of the multiple computer system must be sent sequentially, each message having a correspondingly different address. Alternatively, a broadcast message is sent to all computers and which contains the specific addresses of the computers constituting the subset of the computers to which the message is addressed. In these circumstances, computers receive messages which are not addressed to them and ignore those messages. Both arrangements are wasteful of bandwidth and constitute relatively inefficient communication arrangements.

GENESIS OF THE INVENTION

The genesis of the present invention is a desire to increase the efficiency of network communications generally, and network communications between multiple computers operating as a replicated shared memory arrangement particularly.

SUMMARY OF THE INVENTION

In accordance with the first aspect of the present invention there is disclosed a switch arrangement for transmission of addressed data packets in a communications network including one or more switches each having a plurality of ports and a plurality of computers each of which is connected to at least one switch via at least one port and each of which can send or receive said data packets, said arrangement comprising a memory in each said switch listing for each said port those computers able to be accessed via that port.

In accordance with a second aspect of the present invention there is disclosed a communications method in which data packets addressed to multiple destinations are transmitted via at least one multi-port switch from a source, the method comprising the steps of:

(i) providing the or each switch with a data processing capacity, (ii) having each said switch on receipt of one of said data packets delete those addresses of said multiple destinations which are inaccessible thereby.

In accordance with a third aspect of the present invention there is disclosed a switch arrangement for transmission of addressed replica memory update packets in a multiple computer system having a communications network including one or more switches each having a plurality of ports and a plurality of computers each of which is connected to at least one switch via at least one port and each of which can send or receive said data packets, the computers of said multiple computer system each comprising an independent local memory and each operating a different portion of an application program written to operate on only a single computer, and where each said independent local memory comprises at least one application memory location replicated in all of said independent local memories and is updated to remain substantially similar, and where said packets comprise an identifier and an updated value of a written-to replicated memory location, said arrangement comprising a memory in each said switch listing for each said port those computers able to be accessed via that port.

In accordance with a fourth aspect of the present invention there is disclosed a communications method to be used for replica memory update transmissions between single computers of a multiple computer system, each computer of said system having an independent local memory and operating a different portion of a single application program written to operate on only a single computer, and where at least one application memory location is replicated in the independent local memory of each said computer and updated to remain substantially similar, and in which data packets addressed to multiple destinations are transmitted via at least one multi-port switch from a source, the method comprising the steps of:

(i) providing the or each switch with a data processing capacity, (ii) having each said switch on receipt of one of said data packets delete those addresses of said multiple destinations which are inaccessible thereby.

In accordance with a fifth aspect of the present invention there is disclosed a multiple computer system comprising a switch arrangement for transmission of addressed replica memory update packets in a communications network including one or more switches each having a plurality of ports and a plurality of said computers each of which is connected to at least one switch via at least one port and each of which can send or receive said data packets, said computers each comprising an independent local memory and each operating a different portion of an application program written to operate on only a single computer, and where each said independent local memory comprises at least one application memory location replicated in all of said independent local memories and updated to remain substantially similar, and where said packets comprise an identifier and an updated value of a written-to replicated memory location, said arrangement comprising a memory in each said switch listing for each said port those computers able to be accessed via that port.

In accordance with a sixth aspect of the present invention there is disclosed in a multiple computer system a communications method to be used for replica memory update transmissions between the computers of said system, each computer having an independent local memory and operating a different portion of a single application program written to operate on only a single computer, and where at least one application memory location is replicated in the independent local memory of each said computer and updated to remain substantially similar, and in which data packets addressed to multiple destinations are transmitted via at least one multi-port switch from a source, the method comprising the steps of:

(i) providing the or each switch with a data processing capacity, (ii) having each said switch on receipt of one of said data packets delete those addresses of said multiple destinations which are inaccessible thereby.

BRIEF DESCRIPTION OF THE DRAWINGS

Preferred embodiments of the present invention will now be described with reference to the drawings in which.

DETAILED DESCRIPTION

Figure 1:
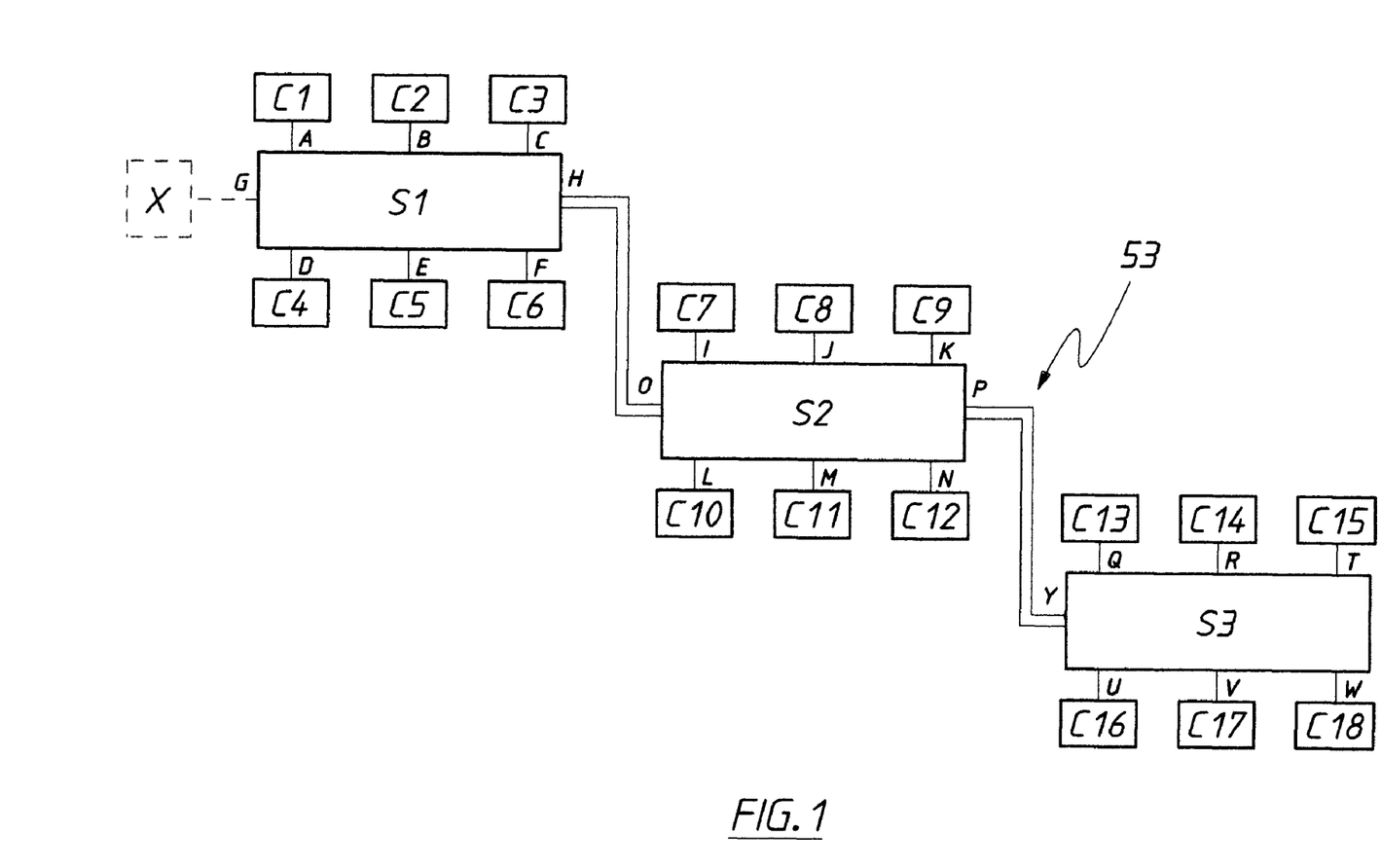
FIG. 1 is a schematic circuit diagram of a communications network incorporating three cascade connected switches and 18 computers.
Figure 1A:
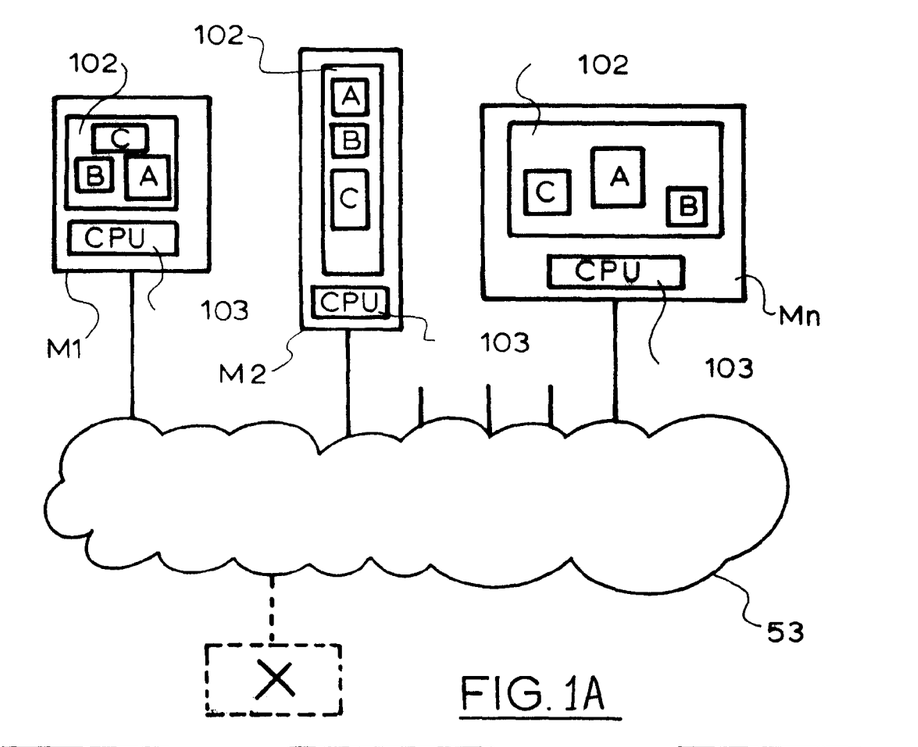
FIG. 1A is a schematic representation of a RSM multiple computer system.

FIG. 1A is a schematic diagram of a replicated shared memory system. In FIG. 1A three machines are shown, of a total of "n" machines (n being an integer greater than one) that is machines M1, M2, ... Mn. Additionally, a communications network 53 is shown interconnecting the three machines and a preferable (but optional) server machine X which can also be provided and which is indicated by broken lines. In each of the individual machines, there exists a memory 102 and a CPU 103. In each memory 102 there exists three memory locations, a memory location A, a memory location B, and a memory location C. Each of these three memory locations is replicated in a memory 102 of each machine.

This arrangement of the replicated shared memory system allows a single application program written for, and intended to be run on, a single machine, to be substantially simultaneously executed on a plurality of machines, each with independent local memories, accessible only by the corresponding portion of the application program executing on that machine, and interconnected via the network 53. In International Patent Application No PCT/AU2005/001641 (WO2006/110,937) to which U.S. patent application Ser. No. 11/259,885 entitled: "Computer Architecture Method of Operation for Multi-Computer Distributed Processing and Co-ordinated Memory and Asset Handling" corresponds, a technique is disclosed to detect modifications or manipulations made to a replicated memory location, such as a write to a replicated memory location A by machine M1 and correspondingly propagate this changed value written by machine M1 to the other machines M2 ... Mn which each have a local replica of memory location A. This result is achieved by detecting write instructions in the executable object code of the application to be run that write to a replicated memory location, such as memory location A, and modifying the executable object code of the application program, at the point corresponding to each such detected write operation, such that new instructions are inserted to additionally record, mark, tag, or by some such other recording means indicate that the value of the written memory location has changed.

Figure 1B:
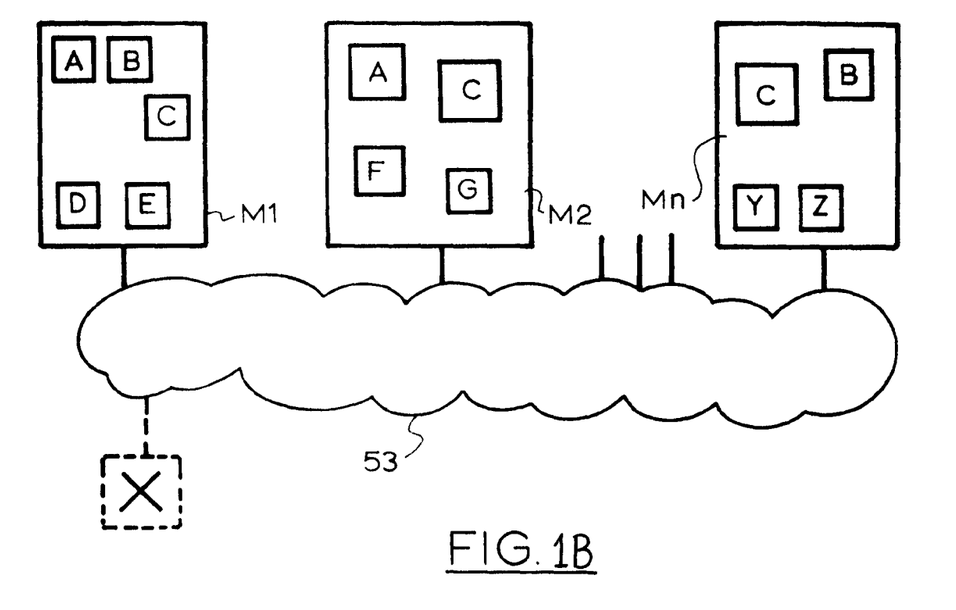
FIG. 1B is a similar schematic representation of a partial or hybrid RSM multiple computer system.

An alternative arrangement is that illustrated in FIG. 1B and termed partial or hybrid replicated shared memory (RSM). Here memory location A is replicated on computers or machines M1 and M2, memory location B is replicated on machines M1 and Mn, and memory location C is replicated on machines M1, M2 and Mn. However, the memory locations D and E are present only on machine M1, the memory locations F and G are present only on machine M2, and the memory locations Y and Z are present only on machine Mn. Such an arrangement is disclosed in Australian Patent Application No. 2005 905 582 (to which U.S. patent application Ser. No. 11/583,958 (60/730,543) and PCT/AU2006/001447 (WO2007/041762) correspond). In such a partial or hybrid RSM systems changes made by one computer to memory locations which are not replicated on any other computer do not need to be updated at all. Furthermore, a change made by any one computer to a memory location which is only replicated on some computers of the multiple computer system need only be propagated or updated to those some computers (and not to all other computers).

Consequently, for both RSM and partial RSM, a background thread task or process is able to, at a later stage, propagate the changed value to the other machines which also replicate the written to memory location, such that subject to an update and propagation delay, the memory contents of the written to memory location on all of the machines on which a replica exists, are substantially identical. Various other alternative embodiments are also disclosed in the abovementioned specification.

Therefore, when operating a multiple computer system in a replicated shared memory arrangement where replicated memory locations are not necessarily replicated on all member machines (such as for example memory location "A" of FIG. 1B), it is desirable that replica memory update transmissions (such as replica memory update messages or packets) transmitted by a single source machine and destined for some subset of all receiving machines on which a corresponding replica memory location resides, is transmitted by the network 53 (comprising one or more switches interconnecting the plural machines) in such a manner that only the machines on which a corresponding replica memory location resides receive such transmission. Additionally, it is further desirable that a single replica memory update transmission is sent corresponding to a single change of a replica memory location of the transmitting machine, and that such single replica memory update transmission be transmitted by the network 53 (comprising the one or more switches interconnecting the plural machines) to multiple receiving machines on which a corresponding replica memory location resides, without duplicate or superfluous transmissions.

In the simplest type of multiple computer system the number of computers is less than the number of ports on a single substantially conventional switch and under these circumstances either broadcast messages or multiple single address messages have to be transmitted to the machines connected to the single switch. Either way is an inefficient use of the available network capacity and bandwidth.

However, as the number of computers in the multiple computer system increases the situation can rapidly be reached where the number of computers exceeds the number of ports on a single switch and therefore it is necessary to have more than one switch. FIG. 1 illustrates an example of such an arrangement in which the communications network 53 is formed from three cascade connected switches S1, S2 and S3 which interconnect 18 computers C1, C2, . . . C18 and a server computer X (which is illustrated in phantom in FIG. 1 in order to indicate that it is optional or preferred).

Before the communications network 53 can commence routine communications, it is necessary for the communications network 53 to undergo a set up procedure. Each computer connected to a switch is allocated an address. This step is preferably undertaken by the server computer X but can be undertaken by the switch itself. The address is an identifier which is unique across the entire network 53. Each of the switches S1-S3 includes logic capability including a memory capability. Thus, each switch is, for example, able to be implemented by means of a microprocessor or a device having similar computing capabilities.

The set-up procedure proceeds in stages so that in, for example, the first stage individual computers C1-C6 are each connected to the switch S1 via corresponding ports A-F. The server computer X already connected to port G allocates the hierarchical numbers 1-6 to the corresponding computers C1-C6 and the switch S1 stores in its local memory that port A corresponds to computer C1, port B corresponds to computer C2, and so on.

Next, switch 2 is connected to switch 1 by means of the interconnection of ports H and O. Computer C7 then connects to switch S2. This connection is communicated by switch S2 to server computer X. Server computer X then communicates to computer C7 its address, in the form of hierarchical number 7. Computer C7 then notifies switch S2 of its address and so switch S2 records in its memory that port I can reach the address 7 of computer C7. In addition, the switch S2 also notifies the switch S1 via ports O and H that switch S2 can communicate with computer C7. Switch S1 therefore makes a note in its memory that its port H can communicate with computer C7. This procedure is then repeated for computer C8, and so on. In this way the communication capability of the system 53 can be built up.

Each new computer's presence is notified to all existing computers and switches with no distinction being made between a switch or a computer. In this aspect, the protocol is said to be "stateless" and thus cheap to implement. Furthermore, the protocol automatically cascades with each new connected switch or computer.

When all the computers indicated in FIG. 1 are connected and all switches are interconnected as indicated in FIG. 1, the position can be represented by the following tables:

| MEMORY TABLE OF SWITCH S1 OF FIG. 1 | |
| --- | --- |
| PORT | ADDRESS/ES ABLE TO BE REACHED VIA THAT PORT |
| A | C1 |
| B | C2 |
| C | C3 |
| D | C4 |
| E | C5 |
| F | C6 |
| G | X |
| H | C7, C8, C9, C10, C11, C12, C13, C14, C15, C16, C17, C18 |

| MEMORY TABLE OF SWITCH S2 OF FIG. 1 | |
| --- | --- |
| PORT | ADDRESS/ES ABLE TO BE REACHED VIA THAT PORT |
| I | C7 |
| J | C8 |
| K | C9 |
| L | C10 |
| M | C11 |
| N | C12 |

-continued

MEMORY TABLE OF SWITCH S2 OF FIG. 1

| PORT | ADDRESS/ES ABLE TO BE REACHED VIA THAT PORT |
|---|---|
| O | C1, C2, C3, C4, C5, C6, X |
| P | C13, C14, C15, C16, C17, C18 |

MEMORY TABLE OF SWITCH S3 OF FIG. 1

| PORT | ADDRESS/ES ABLE TO BE REACHED VIA THAT PORT |
|---|---|
| Q | C13 |
| R | C14 |
| T | C15 |
| U | C16 |
| V | C17 |
| W | C18 |
| Y | C1, C2, C3, C4, C5, C6, C7, C8, C9, C10, C11, C12 |
| Z | — |

The above described arrangement enables a particular computer, say C11, to send a message to only some of the computers, such as computers C1-C10 of the multiple computer system. Such a message is sent from computer C11 to switch S2 via port M. Switch S2 then sends the message directly to computers C7, C8, C9 and C10 via their respective ports I, J, K and L. In addition, switch S2 also sends the message to port O. Port O being connected to port H of switch 1 means that switch S1 receives the message and sends it to computers C1, C2, C3, C4, C5 and C6.

In a co-pending Application No. PCT/AU2007/01497 by the present applicant entitled "Multiple Network Connections for Multiple Computers" and filed simultaneously herewith and claiming priority from Australian Provisional Patent Application No. 2006 905 539 (which corresponds to U.S. Provisional Patent Application No. 60/850,528), a system of using dual data ports to send data from a computer in a multiple computer system is disclosed. The contents of this specification are hereby incorporated into the present specification for all purposes.

Briefly stated, in the last mentioned specification there is disclosed a multiple computer system including a multiplicity of computers each executing a different portion of an applications program written to execute on a single computer, and each having an independent local memory with at least one memory location being replicated in each said local memory, wherein each of the computers is connected to a single communications network via at least two independent ports and wherein each of the computers sends and receives data via the network utilizing data packets which can be transmitted or received out of sequence.

In addition, there is disclosed a multiple computer system including a multiplicity of computers each of which is connected to a single communications network via at least two independent communications ports and wherein each of the computers sends and receives data via the network utilising a data protocol in which data packets can be transmitted or received out of sequence.

Also, there is disclosed a method of interconnecting a multiplicity of computers with a single communications network, the method including the steps of:

(i) connecting each of the computers to the network via at least two independent communications ports, and (ii) having each computer execute a different portion of a single applications program written to execute on only a single computer with each computer having an independent local memory with at least one memory location being replicated in each local memory.

Still further, there is disclosed a method of interconnecting a multiplicity of computers with a single communications network, the method including the steps of:

(i) connecting each of the computers to the network via at least two independent communications ports, and (ii) having each of said computers send and receive data via said network with a data protocol which identifies the sequence position of each data packet in a transmitted sequence of data packets.

There is also disclosed a single computer for use in cooperation with at least one other computer in a multiple computer system, the multiple computer system including a multiplicity of computers each executing a different portion of an applications program written to execute on a single computer, and each of the multiplicity of computers having an independent local memory with at least one memory location being replicated in each said local memory, each of the computers being connected to a communications network via at least two independent ports; the computer including first and second independent communications ports operating independently of each other for sending data to and receiving data from other of the multiplicity of computers.

A method of interconnecting a single computer with a multiplicity of other external computers over a communications network is also disclosed, the method including the steps of:

(i) connecting the single computers to said network via at least two independent communications ports, and (ii) having the single computer execute only a portion of a single applications program written to execute in its entirety on only a one computer, other ones of the multiplicity executing other portions of the single applications program, the single computer and each of the other multiplicity of computers having an independent local memory with at least one memory location being replicated in each said local memory.

Furthermore, there is disclosed a method of interconnecting a single computer with a multiplicity of other external computers over a single communications network, the method including the steps of:

(i) connecting the single computer to the network via at least two independent communications ports, and (ii) having said single computer send and receive data with said other computers via the network with a data protocol which identifies the sequence position of each data packet in a transmitted sequence of data packets.

Thus a system and method for interconnecting multiple computers (M1, M2, ..., Mn) via at least two independent communications ports (28, 38) are disclosed. Data is sent and received via a data protocol which identifies the sequence position of each data packet in a transmitted sequence of data packets. The packets can be transmitted and/or received out of order. The multiple computers each execute a different portion of an application program written to execute on a single computer.

Similarly, in a co-pending Application No. PCT/AU2007/01495 by the present applicant entitled "Multiple Communication Networks for Multiple Computers" and lodged simultaneously herewith and claiming priority from Australian Provisional Patent Application No. 2006 905 533 (which corresponds to U.S. Provisional Patent Application No. 60/850,531) a system of using two or more networks to interconnect multiple computers is disclosed. The contents of this specification are also hereby incorporated into the present specification for all purposes.

Briefly stated, the last mentioned specification discloses a multiple computer system including a multiplicity of computers each executing a different portion of an application program written to be executed on a single computer and each having an independent local memory with at least one memory location being replicated in each said local memory, wherein the computers are interconnected by at least two communications networks.

There is also disclosed a multiple computer system including a multiplicity of computers each of which is interconnected by at least two communications networks and wherein each of the computers sends and receives data via the networks with a data protocol which identifies the sequence position of each data packet in a transmitted sequence of data packets.

In addition there is disclosed a method of interconnecting a multiplicity of computers to form a multiple computer network in which each of the computers executes a different portion of an applications program written to be executed on a single computer and each having an independent local memory with at least one memory location being replicated in each local memory. The method includes the step of:

(i) interconnecting the computers by at least two communications networks.

Furthermore, there is disclosed a method of interconnecting a multiplicity of computers to form a multiple computer network. The includes the steps of:

(i) interconnecting the computers by at least two communications networks, and (ii) having each of said computers send and receive data via said networks with a data protocol which identifies the sequence position of each data packet in a transmitted sequence of data packets.

Thus a system and method for interconnecting multiple computers (M1, M2, . . . , Mn) via at least two communications networks (N1, N2, N3) are disclosed. The connections are made via multiple communications ports (28, 38). Data is sent and received via a data protocol which identifies the sequence position of each data packet in a transmitted sequence of data packets. The packets can be transmitted and/or received out of order. The multiple computers each execute a different portion of an applications program written to execute on a single computer.

The data protocol referred to above is preferably that incorporating a count value described in the present applicant's co-pending Application No. PCT/AU2007/01490 filed simultaneously herewith and claiming priority from Australian Provisional Patent Application No. 2006 905 527 entitled "Advanced Contention Detection" (and to which U.S. Provisional Patent Application No. 60/850,711 corresponds).

Briefly stated this involves a sequence of messages being issued from one or more sources. Typically each source is one computer of the multiple computer system and the messages are memory updating messages which include a memory address and a (new or updated) memory content.

Thus each source issues a string or sequence of messages which are arranged in a time sequence of initiation or transmission. The problem arises that the communications network 53 cannot always guarantee that the messages will be received in their order of transmission. Thus a message which is delayed may update a specific memory location with an old or stale content which inadvertently overwrites a fresh or current content.

In order to address this problem each source of messages includes a count value in each message. The count value indicates the position of each message in the sequence of messages issuing from that source. Thus each new message from a source has a count value incremented (preferably by one) relative to the preceding messages. Thus the message recipient is able to both detect out of order messages, and ignore any message having a count value lower than the last received message from the source. Thus earlier sent but later received messages do not cause stale data to overwrite current data.

Figure 2:
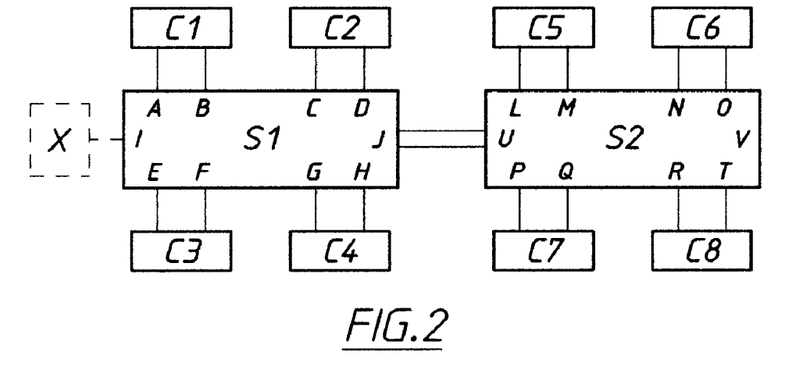
FIG. 2 is a circuit diagram of a communications network incorporating two switches but in which the computers are connected to the switches by means of dual ports.
Figure 3:
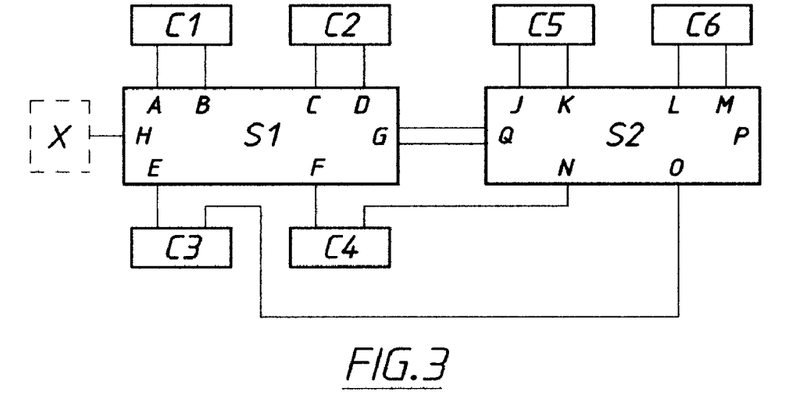
FIG. 3 is a circuit diagram similar to FIG. 2 but illustrating the situation where some computers are connected to two switches.
Figure 4:
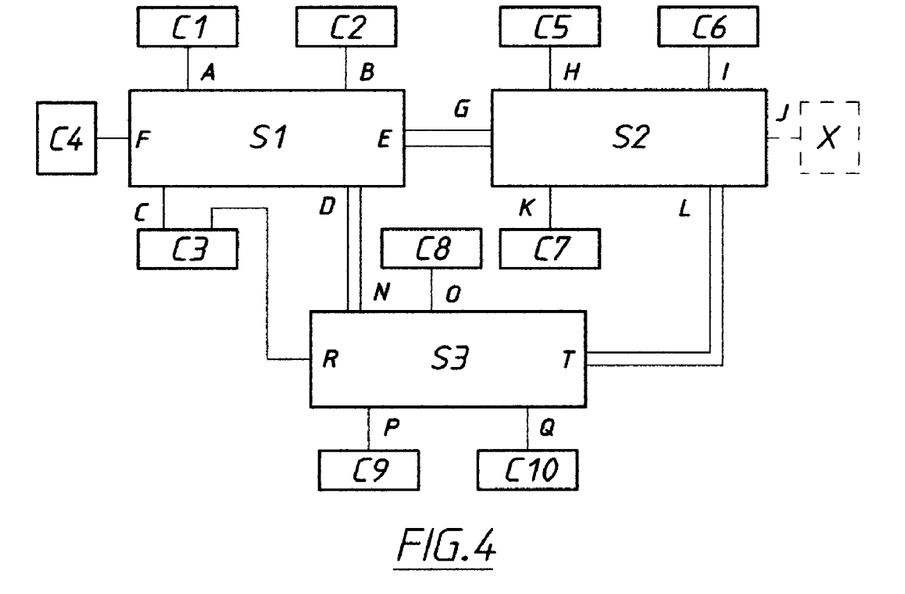
FIG. 4 is a similar circuit diagram illustrating three switches connected in an arrangement providing parallel paths.

With the foregoing in mind, FIGS. 2-4 incorporates elements of the above-referenced and incorporated specifications. In FIG. 2 all of the computers are connected to their corresponding switch by means of a dual port so that computer C1 is connected to computer S1 by means of ports A and B, and so on for the other computers C2-C8. In FIG. 3, a computer such as C4 is connected to switch S1 by means of port F and is connected to switch S2 by means of port N.

In FIG. 4, three switches S1, S2 and S3 are provided which are interconnected so as to provide a parallel path. In addition, computer C3 is connected to switch S1 by means of port C and connected to switch S3 by means of port R. Switch S1 is connected to switch S2 via interconnected ports E and G. Switch S1 is also connected to switch S3 by means of interconnected ports D and N. Similarly, switch S2 is interconnected to switch S3 by means of interconnected ports L and T.

All the networks of FIGS. 2-4 are characterised by the potential of a loop path by means of which a message sent by one computer may be received by the same computer. For example, in FIG. 2 computer C4 sending a message via port G could receive a message back via port H. Similarly, in FIG. 3, computer C4 sending a message via port F could receive the message back via switch S2 and port N. Similarly, in FIG. 4, computer C6 sending a message to switch S2 may find the same message being received by S2 having been transmitted via port L to switch S3 and from switch S3 to switch S1 and then to switch S2 via port G.

The following tables summarize the memory contents of the switches of FIGS. 2-4:

| MEMORY TABLE OF SWITCH S1 OF FIG. 2 | |
|---|---|
| PORT | ADDRESS/ES ABLE TO BE REACHED VIA THAT PORT |
| A | C1 |
| B | C1 |
| C | C2 |
| D | C2 |
| E | C3 |
| F | C3 |
| G | C4 |
| H | C4 |
| I | X |
| J | C5, C6, C7, C8 |

| MEMORY TABLE OF SWITCH S2 OF FIG. 2 | |
|---|---|
| PORT | ADDRESS/ES ABLE TO BE REACHED VIA THAT PORT |
| L | C5 |
| M | C5 |
| N | C6 |
| O | C6 |
| P | C7 |
| Q | C7 |
| R | C8 |
| T | C8 |
| U | C1, C2, C3, C4, X |
| V | — |

| MEMORY TABLE OF SWITCH S1 OF FIG. 3 | |
|---|---|
| PORT | ADDRESS/ES ABLE TO BE REACHED VIA THAT PORT |
| A | C1 |
| B | C1 |
| C | C2 |
| D | C2 |
| E | C3 |
| F | C4 |
| G | C3, C4, C5, C6 |
| H | X |

| MEMORY TABLE OF SWITCH S2 OF FIG. 3 | |
|---|---|
| PORT | ADDRESS/ES ABLE TO BE REACHED VIA THAT PORT |
| J | C5 |
| K | C5 |
| L | C6 |
| M | C6 |
| N | C4 |
| O | C3 |
| P | — |
| Q | C1, C2, C3, C4, X |

| MEMORY TABLE OF SWITCH S1 OF FIG. 4 | |
|---|---|
| PORT | ADDRESS/ES ABLE TO BE REACHED VIA THAT PORT |
| A | C1 |
| B | C2 |
| C | C3 |
| D | C1, C2, C3, C4, C5, C6, C7, C8, C9, C10, X |
| E | C1, C2, C3, C4, C5, C6, C7, X, C8, C9, C10 |
| F | C4 |

| MEMORY TABLE OF SWITCH S2 OF FIG. 4 | |
|---|---|
| PORT | ADDRESS/ES ABLE TO BE REACHED VIA THAT PORT |
| G | C1, C2, C3, C4, C5, C6, C7, X, C8, C9, C10 |
| H | C5 |
| I | C6 |
| J | X |
| K | C7 |
| L | C1, C2, C3, C4, C5, C6, C7, C8, C9, C10, X |

| MEMORY TABLE OF SWITCH S3 OF FIG. 4 | |
|---|---|
| PORT | ADDRESS/ES ABLE TO BE REACHED VIA THAT PORT |
| N | C1, C2, C3, C4, C5, C6, C7, C8, C9, C10, X |
| O | C8 |
| P | C9 |
| Q | C10 |
| R | C3 |
| T | C1, C2, C3, C4, C5, C6, C7, C8, C9, C10, X |

In order to prevent any looping back of messages, all switches follow the rule that when sending an addressed data packet to any port, all addresses other than those which can be reached via that port are deleted from the addresses of the data packet, for example in the address header of the data packet.

Thus, with reference to FIG. 1, switch S1 sending a packet to port D deletes all addresses except that of computer C4. Similarly, switch S1 sending a message to port H deletes all addresses except those relating to computers C7-C18 inclusive.

In connection with FIG. 2, switch S1 sending a message to port E, deletes all addresses other than that of computer C3. The switch will prioritise those ports with only one address prior to sending to those ports which have multiple addresses.

In addition, by decrementing the address list by removing those addresses to which the message has been sent directly, those ports which enable multiple addresses to be accessed receive an address set of a reduced number of addresses. This procedure prevents messages continually being sent via ports which access multiple addresses or computers.

Preferably, for those switches such as switch S3 of FIG. 4 which have two ports which connect to other switches, the switch S3 can divide the message into two parts, one of which contains one group of addresses and the other which contains the remainder of the addresses. This is preferably arranged so that neither of the two parts have common or similar addresses. One message is then sent via port N and the other is sent via port T. This optimises the packet transmission.

In a further embellishment, the computers able to be reached by a particular port, such as port T of switch S3 of FIG. 4, can be arranged into sets so that, for example, the first set would include addresses C5, C6, C7 and X which are reached in a single stage, the second set would include addresses C1, C2 and C3 which are reached in two stages and the third set would include addresses C8, C9 and C10 which are reached in three stages.

In the abovementioned breaking up of the message into two parts (or possibly more than two parts), the first part would include the addresses of the first set, the second part would include the addresses of the second set, and so on.

Figure 5:
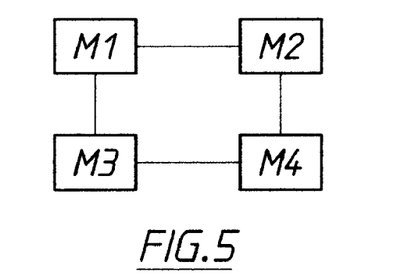
FIG. 5 shows a network topology for four computers which does not utilize a network switch.

FIG. 5 shows a network interconnection of a multiple computer system having four computers M1-M4 each of which has a dual port network interface card. Thus each of the computers M1-M4 has one link which is connected to one computer and another link which is connected to another computer. Thus the cost of any additional switch to form the network interconnecting the computers is avoided. In the embodiment illustrated in FIG. 5, the individual computers M1-M4 by implementing the above described protocol arrangements are able to successfully transmit packets between themselves in an optimised an efficient manner.

Figure 6:
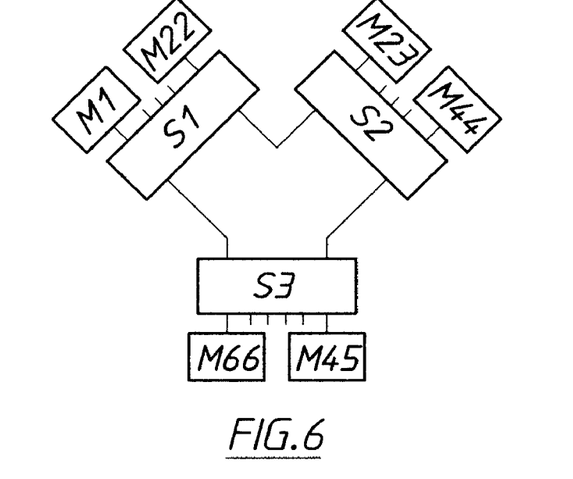
FIG. 6 shows a network topology utilizing three multi-port switches.
Figure 7:
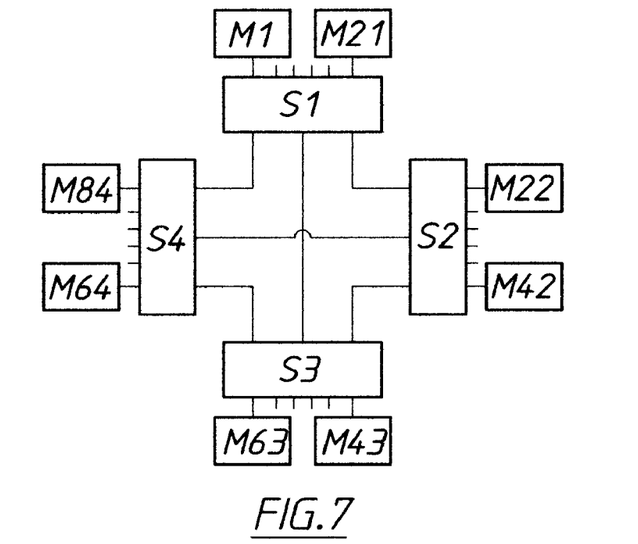
FIG. 7 shows a network topology utilizing four multi-port switches.
Figure 8:
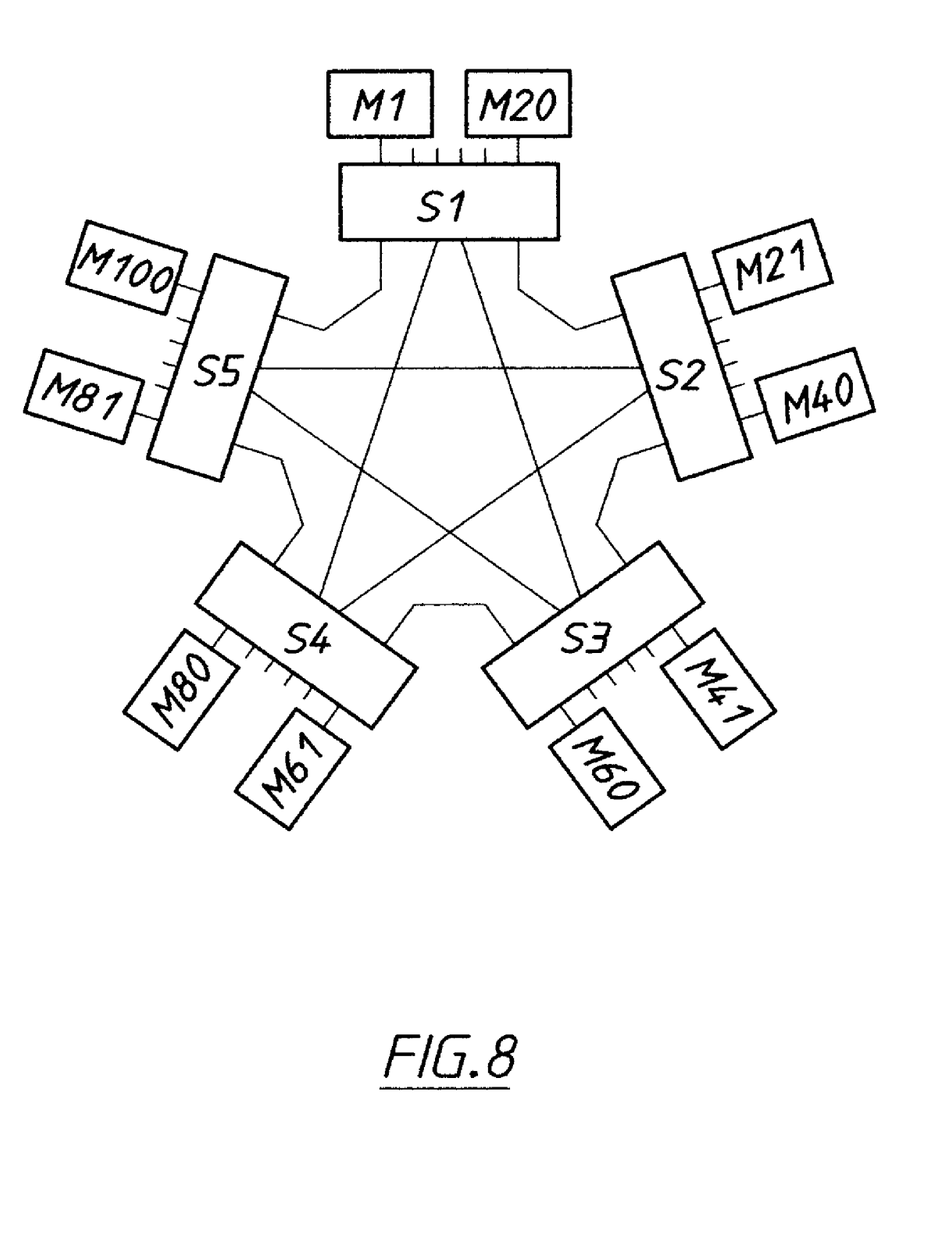
FIG. 8 shows a network topology utilizing five multi-port switches.

FIGS. 6, 7 and 8 respectively show how three, four and five 24 port switches can be used to interconnect multiple computers. In FIG. 6 each of the 24 port switches S1-S3 uses 2 ports for direct connection to a different one of the other two switches. The remaining 22 ports of each switch are each available for connection to a corresponding computer M1-M22, M23-M44 or M45-M66.

In FIG. 7 four 24 port switches S1-S4 are used and this arrangement is suitable for up to 84 computers. Each switch S1-S4 uses 3 ports for direct connection to a different one of the other three switches. The remaining 21 ports of each switch are each available for connection to a corresponding computer M1-M21, M22-M42, M43-M63, M64-M84.

Similarly, in FIG. 8, five 24 port switches S1-S5 are used and this arrangement is suitable for up to 100 computers. Each switch uses 4 ports for direct connection to a different one of the other four switches. The remaining 20 ports of each switch are each available for connection to a corresponding computer M1-M20, M21-M40, M41-M60, M61-M80 and M81-M100.

In all three arrangements of FIGS. 5-8, each switch uses a separate port for direct connection to a different one of all the other switches. The remaining ports of the switches are each available for connection to a corresponding computer.

The above described addressing arrangements transform the utility of the network topology of each of FIGS. 5-8 making them a useful and practical arrangement for a multiple computer system.

It will also be appreciated that the abovementioned protocol arrangements also provide benefits even in the simplest type of multiple computer system where the number of computers is less than the number of ports on a single substantially conventional switch. The above described protocol enables a machine of such a simple system to send one packet addressed to a subset of two or more of the available machines, and the simple switch sends that packet through to only the machines to which the packet is actually addressed. Thus the problems of multiple single address messages are avoided. So too is the problem of a broadcast message which gets sent to all machines regardless of whether or not the packet is actually really intended for all the machines.

Finally, in one specific arrangement of each of the above described figures, the indicated computers C1 . . . Cn (or machines M1 . . . Mn) are operating together as a replicated shared memory arrangement, and utilising the above described switch protocol for replica memory update transmissions between the plural computers C1 . . . Cn (or machines M1 . . . Mn). Specifically, in such specific arrangements, each computer C1 . . . Cn (or machine M1 . . . Mn) is operating a different portion of a same application program written to operate on only a single computer, each computer (machine) of which comprises an independent local memory with at least one application memory location replicated in the independent local memory of at least two machines and updated to remain substantially similar, and utilising the above described protocol for single-sent replica memory update transmissions (for example single-sent replica memory update messages or packets comprising changes made by the transmitting machine to a replicated memory location) sent by each computer (machine) and addressed to multiple receiving computers (machines) on which a corresponding replica memory location resides, each such single-sent transmission being received once by each of the addressed plural computers (machines) and not received by any non-addressed computers (machines). Preferably, the computer (machine) addresses used for each such single-sent replica memory update transmission, are the per-machine hierarchical addresses allocated by the server computer (machine) X for each computers C1 . . . Cn (machine M1 . . . Mn) described above, and known to the single or plural switches.

In alternative multicomputer arrangements, such as distributed shared memory arrangements and more general distributed computing arrangements, the above described methods may still be applicable, advantageous, and used. Specifically, any multi-computer arrangement where replica, "replica-like", duplicate, mirror, cached or copied memory locations exist, such as any multiple computer arrangement where memory locations (singular or plural), objects, classes, libraries, packages etc are resident on a plurality of connected machines and preferably updated to remain consistent, then the methods are applicable. For example, distributed computing arrangements of a plurality of machines (such as distributed shared memory arrangements) with cached memory locations resident on two or more machines and optionally updated to remain consistent comprise a functional "replicated memory system" with regard to such cached memory locations, and is to be included within the scope of the present invention. Thus, it is to be understood that the aforementioned methods apply to such alternative multiple computer arrangements. The above disclosed methods may be applied in such "functional replicated memory systems" (such as distributed shared memory systems with caches) mutatis mutandis.

It is also provided and envisaged that any of the described functions or operations described as being performed by an optional server machine X (or multiple optional server machines) may instead be performed by any one or more than one of the other participating machines of the plurality (such as machines M1, M2, M3 . . . Mn of FIG. 1A).

Alternatively or in combination, it is also further provided and envisaged that any of the described functions or operations described as being performed by an optional server machine X (or multiple optional server machines) may instead be partially performed by (for example broken up amongst) any one or more of the other participating machines of the plurality, such that the plurality of machines taken together accomplish the described functions or operations described as being performed by an optional machine X. For example, the described functions or operations described as being performed by an optional server machine X may broken up amongst one or more of the participating machines of the plurality.

Further alternatively or in combination, it is also further provided and envisaged that any of the described functions or operations described as being performed by an optional server machine X (or multiple optional server mOachines) may instead be performed or accomplished by a combination of an optional server machine X (or multiple optional server machines) and any one or more of the other participating machines of the plurality (such as machines M1, M2, M3 . . . Mn), such that the plurality of machines and optional server machines taken together accomplish the described functions or operations described as being performed by an optional single machine X. For example, the described functions or operations described as being performed by an optional server machine X may broken up amongst one or more of an optional server machine X and one or more of the participating machines of the plurality.

Any and all embodiments of the present invention are able to take numerous forms and implementations, including in software implementations, hardware implementations, silicon implementations, firmware implementation, or software/hardware/silicon/firmware combination implementations.

Various methods and/or means are described relative to embodiments of the present invention. In at least one embodiment of the invention, any one or each of these various means may be implemented by computer program code statements or instructions (possibly including by a plurality of computer program code statements or instructions) that execute within computer logic circuits, processors, ASICs, microprocessors, microcontrollers, or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the aforedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer on which it executes or on a computer coupled with, connected to, or otherwise in signal communications with the computer on which the computer program or computer program product is present or executing. Such computer program or computer program product modifying the operation and architectural structure of the computer, computing machine, and/or information appliance to alter the technical operation of the computer and realize the technical effects described herein.

To summarize, there is disclosed a switch arrangement for transmission of addressed data packets in a communications network including one or more switches each having a plurality of ports and a plurality of computers each of which is connected to at least one switch via at least one port and each of which can send or receive the data packets, the arrangement comprising a memory in each the switch listing for each the port those computers able to be accessed via that port.

Preferably each switch never sends back to one of the computers a data packet originating with the one computer.

Preferably each switch sending one of the addressed data packets containing the addresses of a plurality of destination computers to a specific one of the ports deletes from the addresses any address which cannot be reached via the specific port.

Also there is disclosed a communications method in which data packets addressed to multiple destinations are transmitted via at least one multi-port switch from a source, the method comprising the steps of:

(i) providing the or each switch with a data processing capacity, (ii) having each switch on receipt of one of the data packets delete those addresses of the multiple destinations which are inaccessible thereby.

Preferably the method includes the further steps of:

(iii) maintaining a list of the corresponding port for each one of those destinations to which the switch is directly connected and the corresponding port(s) of that or those destination(s) to which the switch is not directly connected, and (iii) having each switch on receipt of one of the data packets addressed both to at least one destination to which the switch is directly connected and at least one destination to which the switch is indirectly connected, deliver the packet to the corresponding port of the directly connected destination(s) and delete the addresses of the directly connected destination(s) from the packet before delivering the one packet to the port(s) corresponding to that or those destination(s) to which the switch is not directly connected.

Preferably ports with a first plurality of addresses are prioritised over ports with either a single address or a second plurality of addresses, the second plurality being less than the first plurality.

There also is disclosed a switch arrangement for transmission of addressed replica memory update packets in a multiple computer system having communications network including one or more switches each having a plurality of ports and a plurality of computers each of which is connected to at least one switch via at least one port and each of which can send or receive the data packets, the computers of the multiple computer system each comprising an independent local memory and each operating a different portion of an application program written to operate on only a single computer, and where each the independent local memory comprises at least one application memory location replicated in all of the independent local memories and is updated to remain substantially similar, and where the packets comprise an identifier and an updated value of a written-to replicated memory location, the arrangement comprising a memory in each the switch listing for each the port those computers able to be accessed via that port.

Further there is disclosed a communications method to be used for replica memory update transmissions between single computers of a multiple computer system, each computer with of the system having an independent local memory and operating a different portion of a single application program written to operate on only a single computer, and where at least one application memory location is replicated in the independent local memory of each the computer and updated to remain substantially similar, and in which data packets addressed to multiple destinations are transmitted via at least one multi-port switch from a source, the method comprising the steps of:

(i) providing the or each switch with a data processing capacity, (ii) having each the switch on receipt of one of the data packets delete those addresses of the multiple destinations which are inaccessible thereby.

Furthermore there is disclosed a multiple computer system comprising a switch arrangement for transmission of addressed replica memory update packets in a communications network including one or more switches each having a plurality of ports and a plurality of the computers each of which is connected to at least one switch via at least one port and each of which can send or receive the data packets, the computers each comprising an independent local memory and each operating a different portion of an application program written to operate on only a single computer, and where each the independent local memory comprises at least one application memory location replicated in all of the independent local memories and updated to remain substantially similar, and where the packets comprise an identifier and an updated value of a written-to replicated memory location, the arrangement comprising a memory in each the switch listing for each the port those computers able to be accessed via that port.

Also furthermore there is disclosed a multiple computer system comprising a communications method to be used for replica memory update transmissions between the computers of the system, each computer with having an independent local memory and operating a different portion of a single application program written to operate on only a single computer, and where at least one application memory location is replicated in the independent local memory of each the computer and updated to remain substantially similar, and in which data packets addressed to multiple destinations are transmitted via at least one multi-port switch from a source, the method comprising the steps of:

(i) providing the or each switch with a data processing capacity, (ii) having each the switch on receipt of one of the data packets delete those addresses of the multiple destinations which are inaccessible thereby.

The foregoing describes only some embodiments of the present invention and modifications, obvious to those skilled in the communication arts, can be made thereto without departing from the scope of the present invention.

The term "comprising" (and its grammatical variations) as used herein is used in the inclusive sense of "including" or "having" and not in the exclusive sense of "consisting only of".

I claim:

1. A communications method in which data packets addressed to multiple destinations are transmitted via at least one multi-port switch from a source, the method comprising the steps of:
    (i) providing the or each switch with a data processing capacity;
    (ii) having each said switch on receipt of one of said data packets delete those addresses of said multiple destinations which are inaccessible thereby;
    (iii) maintaining a list of the corresponding port for each said one of those destinations to which the switch is directly connected and the corresponding port(s) of that or those destination(s) to which the switch is not directly connected; and
    (iv) having each said switch on receipt of one of said data packets addressed both to at least one destination to which the switch is directly connected and at least one destination to which said switch is indirectly connected, deliver said packet to the corresponding port of said directly connected destination(s) and delete the addresses of said directly connected destination(s) from said packet before delivering said one packet to the port(s) corresponding to that or those destination(s) to which said switch is not directly connected.

2. The method of claim 1, wherein ports with a first plurality of addresses are prioritized over ports with either a single address or a second plurality of addresses, said second plurality being less than said first plurality.

3. An article of manufacture comprising a tangible computer readable media containing computer executable instructions which, when executed by a processor that is coupled with a memory to modify the operation of the processor and devices or systems coupled with said processor; the modification of operation including performing a communications method in which data packets addressed to multiple destinations are transmitted via at least one multi-port switch from a source, the method comprising:
    (i) providing the at least one multi-port switch with a data processing capacity;
    (ii) having each said at least one multi-port switch, on receipt of one of said data packets, delete addresses of said multiple destinations which are inaccessible;
    (iii) maintaining a list of the corresponding port for each said one of those destinations to which the switch is directly connected and the corresponding port(s) of that or those destination(s) to which the switch is not directly connected; and
    (iv) having each said switch, upon receipt of one of said data packets addressed both to at least one destination to which the switch is directly connected and at least one destination to which said switch is indirectly connected, deliver said packet to a corresponding port of said directly connected destination(s) and delete addresses of said directly connected destination(s) from said packet before delivering said one packet to the port(s) corresponding to that or those destination(s) to which said switch is not directly connected.

4. The article of manufacture of claim 3, wherein ports with a first plurality of addresses are prioritized over ports with either a single address or a second plurality of addresses, said second plurality being less than said first plurality.

* * * * *